United States Patent [19]

Wellington et al.

[11] Patent Number: 4,825,741
[45] Date of Patent: May 2, 1989

[54] RECIPROCATORY MACHINE TOOL

[75] Inventors: Robert Wellington; Louis Bell, both of Albuquerque, N. Mex.

[73] Assignee: Rio Grande-Albuquerque, Inc., Albuquerque, N. Mex.

[21] Appl. No.: 33,835

[22] Filed: Apr. 3, 1987

[51] Int. Cl.$^4$ .............................................. B27B 11/00
[52] U.S. Cl. ........................................ 83/748; 83/781; 83/786; 83/615; 83/639; 74/110
[58] Field of Search ................. 83/748, 746, 786, 783, 83/784, 639, 72, 781, 615; 74/110, 89.22; 30/513

[56] References Cited

U.S. PATENT DOCUMENTS

| | | | |
|---|---|---|---|
| 2,345,261 | 3/1944 | Jensen | 83/786 |
| 2,613,701 | 10/1952 | Nathan | 83/748 |
| 2,780,249 | 2/1957 | Andreae et al. | 83/781 |
| 2,808,086 | 10/1957 | Dreier | 30/513 |
| 2,868,248 | 1/1959 | Pedersen | 83/748 |
| 2,936,639 | 5/1960 | Philippi | 74/110 |
| 4,235,421 | 11/1980 | Phillips | 74/110 |
| 4,651,582 | 3/1987 | Bender | 74/89.22 |

Primary Examiner—Douglas D. Watts
Assistant Examiner—Eugenia A. Jones
Attorney, Agent, or Firm—Basile and Hanlon

[57] ABSTRACT

A power driven reciprocatory machine tool employs an endless belt trained in tension around spaced end pulleys to transmit reciprocatory movement of a drive attached to one run of the belt to a tool carrier clamped to the opposite run of the belt. The moving elements attached to the opposite runs of the belt counterbalance each other to minimize vibration generated by stroke reversal. In one application, the tool carrier mounts a relatively thin saw blade between spaced upper and lower arms which is employed to saw finely detailed edges on a workpiece manually guided to the blade on a stationary horizontal work table. Clamp means which are tightened by the tension of the blade couple the blade to upper and lower arms of the tool carrier, one of the clamp means being mounted on its arm by a manually adjustable blade tensioning device.

The saw, tool carrier and drive may be rotatively adjusted about a horizontal axis to cut inclined or beveled edges on a workpiece supported on the stationary horizontal table.

6 Claims, 4 Drawing Sheets

RECIPROCATORY MACHINE TOOL

BACKGROUND OF THE INVENTION

The present invention is concerned with light duty bench mounted machines employed to drive a tool such as a saw blade, file, burnishing mandrel, etc., in reciprocation to operate on a relatively small table supported workpiece as, for example, in jewelry making.

The invention is specifically disclosed as applied to a jig-saw in which an extremely fine saw blade is employed to cut intricate edge formations in fine detail. Typically, the machine includes a work table upon which the workpiece is supported and the reciprocating saw blade passes through a hole in the table. The workpiece is manually guided to the blade.

Because the table is mounted on the same frame as is the reciprocatory drive mechanism which drives the saw, vibratory forces generated by the drive mechanism are transmitted to the work table. Even minor vibrations of the work table are highly undesirable in an environment where precise and finely detailed patterns are being cut on a manually guided work piece of precious metal. Because the operator must rely on a fixed relationship between the path of the saw blade and the surface of the table, it is not a simple matter to isolate the table from vibrations generated by the saw reciprocating mechanism.

Frequently it is necessary that the workpiece be cut with a beveled edge. Typically cutting of beveled edges with saws of the type the present invention is concerned is accomplished by mounting the table for tilting movement and locking it in place at the desired angle. Where the angle of the cut requires tilting of the table to any substantial extent from its normal horizontal position, the operator finds it difficult to accommodate to the unnatural position of the table.

Because the saw blades employed in making intricate finely detailed cuts must be of extremely small cross section, and regulation of blade tension and blade deflection induced by the feeding of the workpiece against the blade must be carefully regulated.

The present invention is directed to a reciprocatory saw in which vibrations induced by the reciprocatory drive are substantially eliminated by a counterbalancing technique and in which the reciprocatory drive and saw may be tilted as a unit relative to a stationary horizontal work table. A saw blade clamping system which accommodates simple and rapid blade replacement cooperates wih a blade tensioning adjustment which is operable with the blade clamped.

SUMMARY OF THE INVENTION

In accordance with the present invention, a housing containing an air driven reciprocatory drive mechanism is mounted upon a fixed frame or base for rotary adjustment about a horizontal axis. The reciprocatory drive takes the form of a double acting air cylinder whose piston rod carries an interruptor member cooperable with spaced fluidic proximity sensors connected into the air pressure supply system to initiate a stroke reversal of the piston at each end of its stroke. The piston rod also carries a coupling member which fixedly couples the piston to one run of an endless belt trained about a pair of end pulleys mounted for free rotation within the housing. The opposite run of the endless belt is in turn coupled to a tool carrier upon which the saw blade is mounted. The weight of the tool carrier and other elements coupled to this last run of the endless belt is equal to the weight of the moveable elements—i.e., the piston, piston rod, coupling member, etc. coupled to the other run of the belt. Thus, the weight of the tool carrier, etc. attached to one run of the belt is counterbalanced by the weight of the piston, etc. attached to the opposite run of the belt. Because the piston and tool carrier are coupled to opposite runs of the belt, they move in opposite directions when the piston is being driven in reciprocation. Thus, the inertial forces generated at stroke reversal are also counterbalanced at all times. This minimizes and substantially eliminates stroke reversal induced vibration to the housing.

The tool carrier consists of a generally C shaped frame having horizontally extending upper and lower arms. At the outer end of each arm, a rotary cam type clamp is mounted, the clamps being oriented in a direction such that tension applied to a saw blade extending between the two clamps will cause the clamps to tighten. The clamp on the upper arm is not mounted directly upon the arm but is instead mounted at the end of a lever pivotally mounted on the upper arm. A manually actuated cam mechanism is employed to pivot this arm upwardly to increase the tension of a saw blade clamp between the arms.

A workpiece supporting table is fixedly mounted on the base and has a central opening through which the saw blade passes. An indicator arm pivotally mounted on the front of the housing may be swung down to a position adjacent the saw blade so that the operator can observe any deflections of the blade caused by forcing the workpiece too hard against the blade.

Other objects and features of the invention will become apparent by reference to the following specification and to the drawings.

IN THE DRAWINGS

Figure 1:
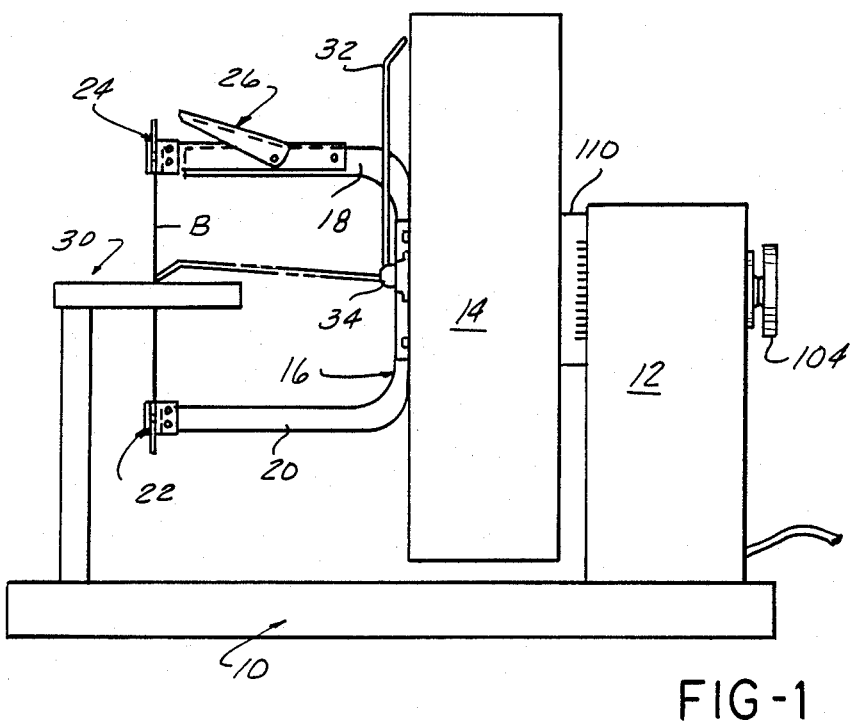
FIG. 1 is a side elevational view of a power driven reciprocatory saw embodying the present invention.
Figure 5:
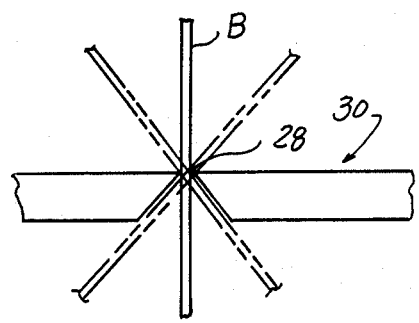
FIG. 5 is a cross sectional view taken on line 5—5 of FIG. 1.

The overall arrangement of a machine embodying the present invention is best seen in FIG. 1. The machine includes a base designated generally 10 upon which is mounted a fixed or stationary housing 12. A second housing 14 is supported upon housing 12 for rotary adjustment relative to housing 12 about a horizontal axis. Projecting from the left-hand side of housing 14 as viewed in FIG. 1 is a generally C shaped tool carrier designated generally 16 having horizontally extending upper 18 and lower 20 arms. A saw blade B is clamped at its lower end to lower arm 20 by a clamp designated generally 22 and is clamped at its upper end by a clamp designated generally 24 carried on a tensioning mechanism designated generally 26 mounted on upper arm 18. The saw blade B passes through an opening 28 (FIG. 5) in a work table 30 which is fixedly mounted upon base 10. As viewed in FIG. 1, tool carrier 16 is driven in vertical reciprocatory movement by a drive mechanism to be described below which is mounted within housing 14. Workpieces to be operated on by saw B are supported upon the horizontal surface of table 30 and manually guided into the saw.

A deflection indicator in the form of an elongate finger mounted on the front of housing 14 by a ball and socket assembly 34 may be moved so that its tip is adjacent saw blade B, as indicated in broken line in FIG. 1, to enable the operator to closely monitor the deflection of blade B to avoid feeding work too forcefully against the relatively delicate blade B.

Figure 3:
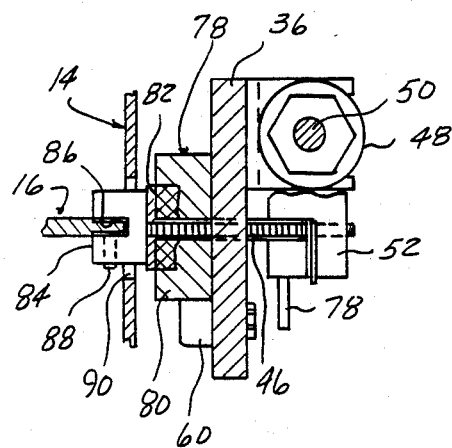
FIG. 3 is a cross sectional view taken on line 3—3 of FIG. 2.
Figure 2:
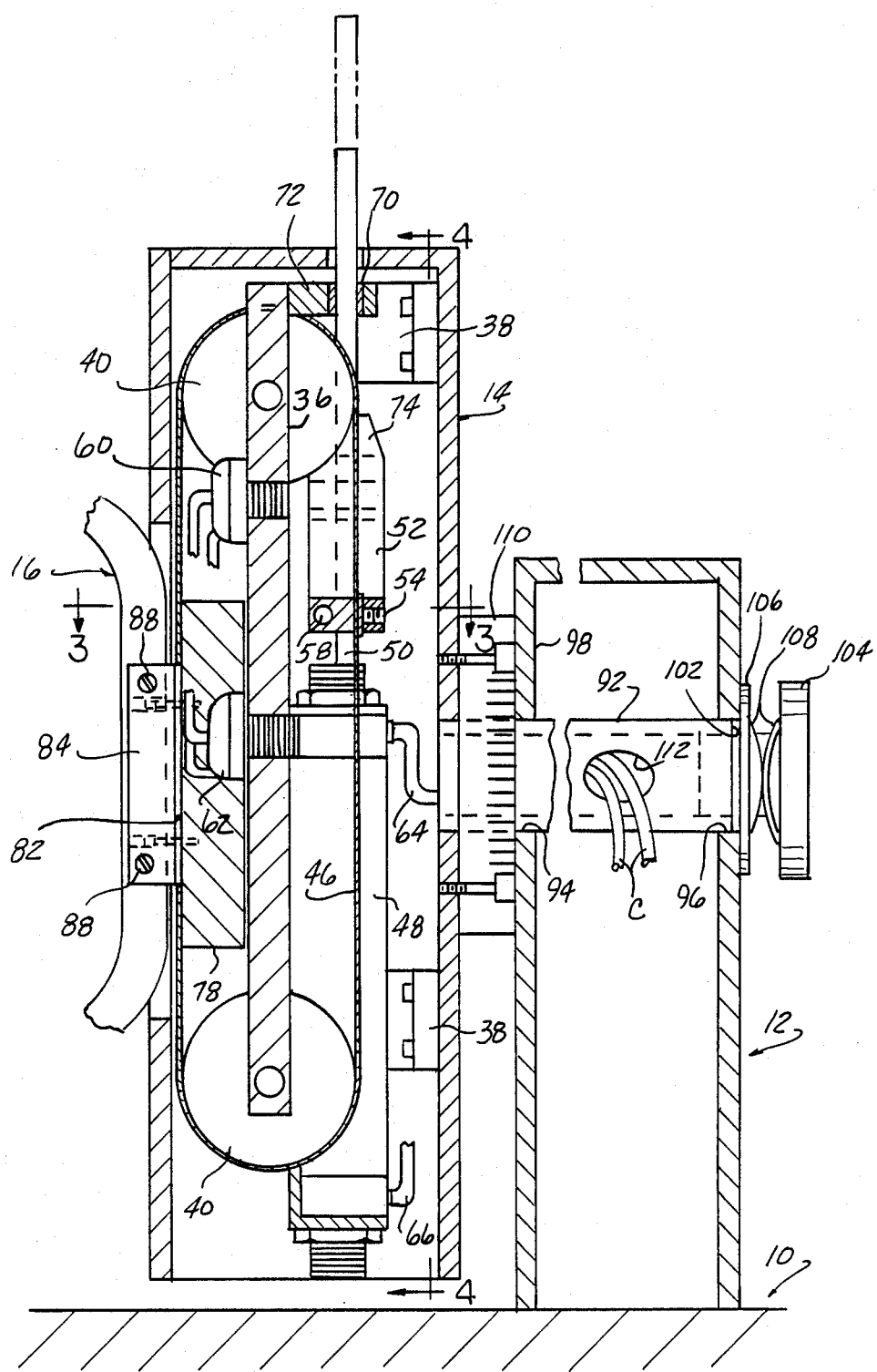
FIG. 2 is a cross sectional view taken on a vertical plane through the housing of FIG. 1, with certain parts broken away or omitted.
Figure 4:
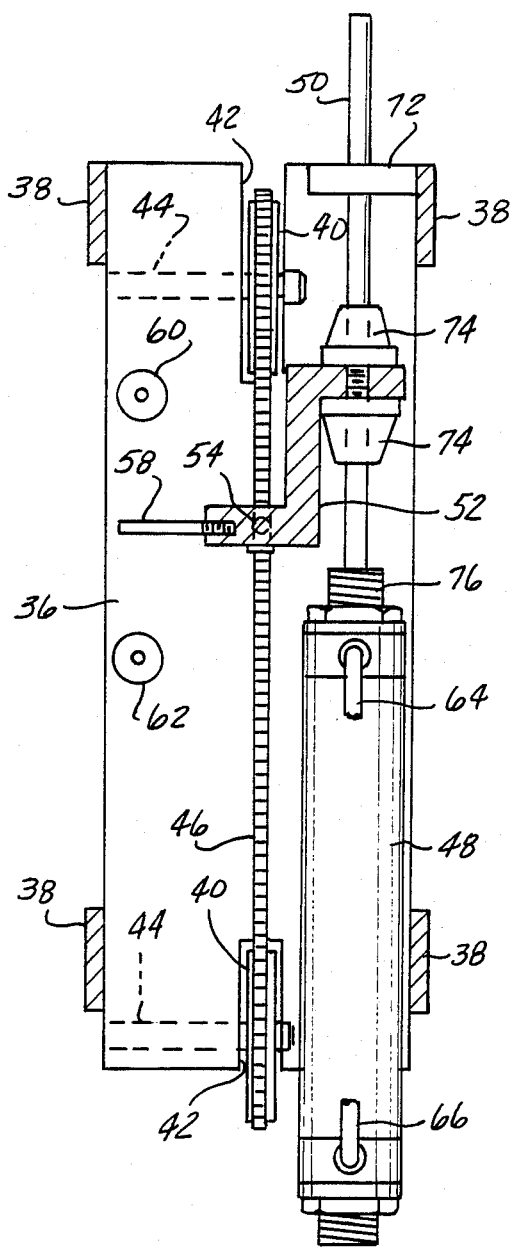
FIG. 4 is a cross sectional view taken on line 4—4 of FIG. 2.

The mechanism employed to drive saw blade B in reciprocation is best seen in FIGS. 2-4. A rigid mounting plate 36 is fixedly mounted within housing 14 as by brackets 38. A pair of end pulleys are mounted within slots 42 in plate 36 as by shafts 44 for free rotation relative to plate 36 about spaced parallel axes. An endless belt 46 is operatively trained about end pulleys 40 and extends between the pulleys in spaced parallel runs as best seen in FIG. 2. Belt 46 is preferably of a steel reinforced rubber composition and is mounted under tension on the pulleys.

The cylinder 48 of a double acting air motor is fixedly mounted on plate 36 at one side of one run of belt 46 as best seen in FIG. 4. The piston rod 50 of the motor extends parallel to the adjacent run of the belt and a coupling member 52, best seen in FIG. 4, is fixedly secured to piston rod 50 and clamped, as by a set screw 54 to belt 46, which passes through a slot 56 (FIG. 2) in coupling member 52.

Coupling member 52 also carries an interrupter member 58 which, upon movement of piston rod 50, will pass into the range of air jets issuing from fluidic proximity sensors 60, 62 mounted on plate 36. Sensors 60 and 62 are connected into a pneumatic control circuit to be described below to control the flow of air to and from rod end 64 and head end 66 conduits of cylinder 48 to reverse the direction of stroke of piston rod 50 when interrupter 58 moves into proximity with sensor 60 and 62.

As best seen in FIGS. 2 and 4, piston rod 50 extends upwardly beyond its point of connection to coupling member 52 and is slidably guided within a bushing 70 (FIG. 2) mounted within a bushing block 72 fixedly mounted on plate 36. At opposite sides of coupling member 52 at its point of connection to piston rod 50, resilient cushions 74 of truncated conical shape are mounted to absorb some of the momentum of the piston strokes as the point of stroke reversal is approached. The conical shape of cushions 74 applies an increasing amount of impedance as the cushions are compressed either against bushing block 72 or a threaded stud 76 mounted at the top of cylinder 48.

Referring now particularly to FIGS. 2 and 3, a ball slide mechanism designated generally 78 of commercially available construction is mounted upon the left-hand side of plate 36 as viewed in FIGS. 2 and 3. Mechanism 78 can take any of several forms, and consists basically of a frame or housing 80 (FIG. 3) which is fixedly mounted upon plae 36, and a shuttle or slide 82 (FIG. 3) which is received and slidably guided within frame 80 for linear sliding movement in either direction. Mechanism 78 is so oriented that its shuttle 82 moves vertically relative to plate 36 and parallel to the left-hand run of belt 46 as viewed in FIG. 2. A tool carrier mounting block 84 fixedly clamps belt 46 to the shuttle 82 of ball slide 78, with tool carrier 16 in turn being fixedly mounted within a slot 86 in mounting block 84 as by such grooves 88. As best seen in FIG. 3, block 84 projects forwardly from shuttle 82 through a slot 90 formed in the front wall of housing 14.

As best seen in FIG. 2, a hollow shaft 92 is fixedly secured, as by welding, to the rear wall of housing 14 and projects rearwardly from housing 14 to be rotatably received within bores 94, 96 through the opposed front and rear walls 98, 100 respectively of the stationary housing 12. It will be noted that the free end 102 of shaft 92 does not project entirely through wall 100 of housing 12. A manually rotatable clamping knob 104 is threadably received within the end 102 of shaft 92 and a pair of opposed belleville springs 106 are engaged between the knob 104 and a washer 108 which is located in frictional engagement with the outer side of wall 102 of the housing. This arrangement permits housing 14 to be rotatively adjusted relative to housing 12 about the axis of shaft 92 by loosening clamping knob 104 to permit the rotative adjustment and then tightening knob 104 to frictionally clamp housing 14 in the rotatively adjusted position. A rotary scale 110 fixedly mounted on housing 14 is provided to cooperate with a reference mark (not shown) on wall 98 of housing 12 to indicate the angular orientation of housing 14 relative to housing 12. An opening 112 through the wall of shaft 92 is provided so that conduits C of the pneumatic control system to be described below may be led from the interior of housing 12 into the interior of housing 14 through the hollow shaft 92.

FIGS. 6–12 show details of the latching and tensioning mechanisms employed to mount the saw blade B in tension between the upper and lower arms 18 and 20 of tool carrier 16 as shown in FIG. 1.

Figure 6:
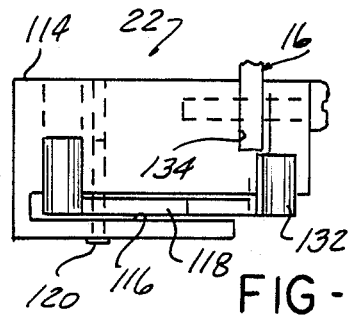
FIG. 6 is a top plan view of the lower blade clamp.
Figure 7:
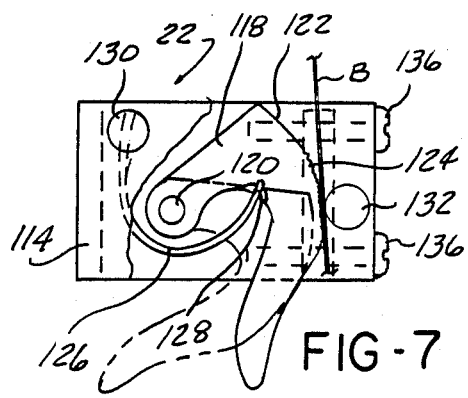
FIG. 7 is a side elevational view, with certain parts broken away, of the lower blade clamp.

Referring now particularly to FIGS. 6 and 7, details of the lower latch 22 are shown in these figures. The lower latch 22 includes a latch block 114 which, as best seen in the plan view of FIG. 6, is formed with an open ended slot 116 which snugly, but slidably, receives a latch cam 118 mounted for pivotal movement on block 114 as by a pivot pin 120. As best seen in FIG. 7, latch cam 118 is formed with a curved cam surface 122 which is of gradually increasing radius from the axis of pivot pin 120 in a clockwise direction about axis 120 as viewed in FIG. 7. At least a portion of the cam surface 122 is serrated or grooved as at 124. A torsion spring 126 has one end seated with a press fit in a slot 128 in cam 118 and has its other end received within a slot formed in a pin 130 mounted in block 114. Spring 126 rotatively biases cam 118 in a clockwise direction about pivot 120 to normally bias the cam to an unlatched position indicated in broken line in FIG. 7.

Cam 118 acts to fixedly clamp the lower end of saw blade B between the serrated surface 124 of the cam and a pin 132 fixedly mounted in block 114. With the cam 118 in its unlatched position indicated in broken line in FIG. 7, the blade B can be manually inserted between the cam and pin 132. Cam 118 is then manually rotated counterclockwise and pressed to the full line position shown in FIG. 7 in which the blade B is clamped between the cam and pin 132. Tension applied to blade B will tend to pull the blade upwardly as viewed in FIG. 7, and this action will simply function to urge cam 118 in counterclockwise movement about its pivot 120, thus tightening the clamping force.

Referring now to FIG. 6, block 114 is formed with a second slot 134 which snugly receives the end of lower arm 20 of tool carrier 16. Bolts 136 fixedly secure block 114 to arm 20.

Figure 8:
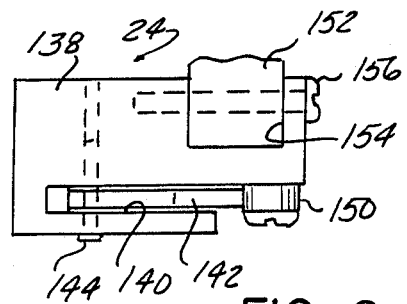
FIG. 8 is a top plan view of the upper blade clamp.
Figure 9:
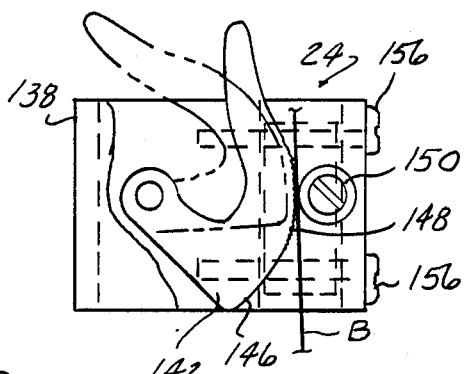
FIG. 9 is a side elevational view, with certain parts broken away, of the upper blade clamp.

The upper latch assembly 24, shown in FIGS. 8 and 9, employs a block 138 formed with a slot 140 (FIG. 8) which snugly and slidably receives a cam 142 pivotally mounted on block 138 by pin 144. Cam 142 is similarly formed with a curved cam surface 146 whose radius from pin 144 gradually increases in a counterclockwise direction as viewed in FIG. 9. The geometry of cam 142 is such that it is gravitationally biased to a closed position shown in full line in FIG. 9 in which a serrated portion 148 of cam surface 146 will clamp the saw blade B between the cam and a pin 150 mounted on block 138. Again, it will be noted that tension applied to blade B tends to shift cam 142 in a direction tightening the clamping force exerted upon the saw blade.

Unlike lower latch 22, upper latch 24 is not mounted directly upon upper arm 18 of tool carrier 16, but is instead mounted upon the outer end of a tensioning lever 152 (FIG. 8) which is received snugly within a slot 154 (FIG. 8) in block 138 and fixedly attached as by bolts 156.

Figure 12:
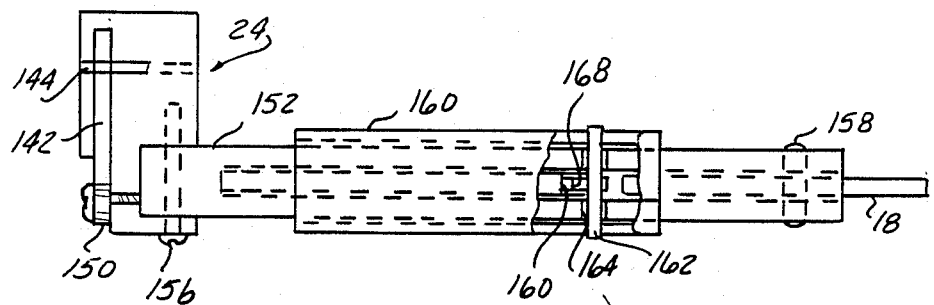
FIG. 12 is a top plan view of a portion of the upper tool carrier arm, showing the tensioning mechanism and upper blade clamp.
Figure 11:
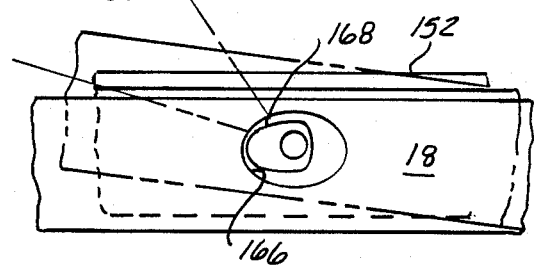
FIG. 11 is a detail side elevational view, with certain parts broken away, showing further details of the tensioning mechanism.
Figure 10:
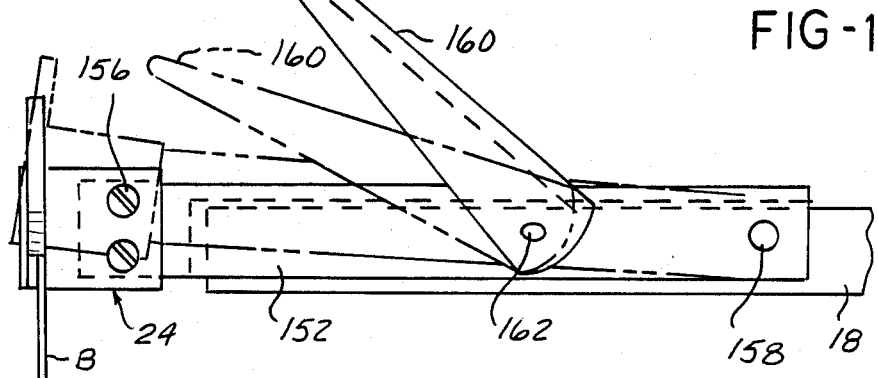
FIG. 10 is a side elevational view of a portion of the upper tool carrier arm showing details of the tensioning device.

Referring now to FIGS. 10–12, lever 152 is of an inverted generally U shaped transverse cross section which overlies upper arm 18 of tool carrier 16. Lever 152 is pivotally mounted at its right-hand end as viewed in FIGS. 10 and 12 upon arm 18 by a pivot pin 158 which passes through the opposed legs of the U shaped cross section lever 152 and a bore through arm 18.

A manually operable tensioning lever 160, again of an inverted U shaped transverse cross section fits over lever 152 and is pivotally mounted upon lever 152 by a pin 162 fixed at its opposite ends to the leg portions of the U shaped cross section tensioning lever 160 and freely passing through aligned bores 164 in legs of U shaped cross sectioned lever 152 and an enlarged opening 166 in arm 18. A cam 168 is eccentrically mounted upon pin 162 as best seen in FIG. 11 and is fixedly secured against rotation relative to pin 162. As best seen in FIG. 11, the enlarged opening 166 through arm 18 is of generally elliptical shape with the minor diameter of the elliptical opening slightly exceeding the maximum diameter of the cam 168.

With tensioning lever 160 in the full line position shown in FIG. 10, the eccentricity of cam 168 on pin 162 is such that the high point or maximum radius section of the cam is at approximately a 9 o'clock relationship to the axis of pin 162. Upon swinging lever 160 as viewed in FIG. 10 downwardly in a counterclockwise direction toward the broken line position, the high point of the eccentricity of cam 168 is likewise moved counterclockwise to move its high point into sliding engagement with the lower curved surface of opening 166. Opening 166 is in frame member 18, and thus the engagement of the cam with the lower surface of opening 166 will cause pivot pin 162 to move upwardly relative to arm 18, thereby elevating lever 152 from the full line position of FIG. 10 toward the broken line position of FIG. 10. This action applies tension to the saw blade B since its upper latch 24 must move upwardly with the distal end of lever 152. The frictional engagement between cam 168 and the surface of opening 166 is sufficient to maintain lever 152 in its adjusted position relative to arm 18.

Figure 13:
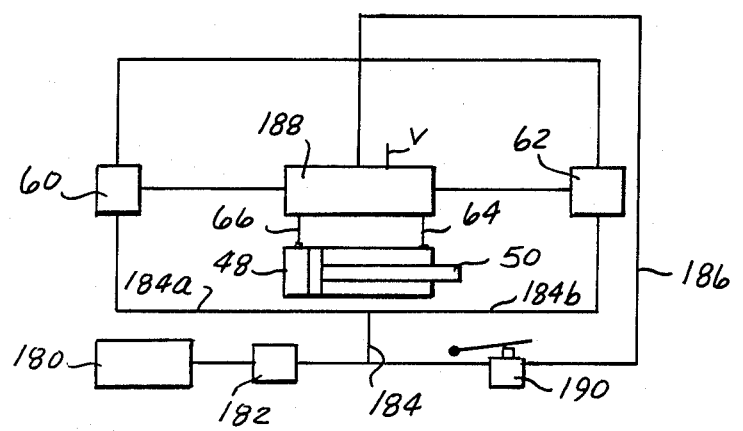
FIG. 13 is a schematic diagram of the pneumatic control circuit for the reciprocatory drive motor.

A simplified schematic diagram of the pneumatic control circuit, omitting many conventional elements such as pressure regulators, filters, etc. is shown in FIG. 13. A source of air under pressure 180 is connected via a manually operable on/off valve 182 to a first branch conduit 184 which conducts air under pressure continuously via conduits 184a, 1284b to the fluidic proximity sensors 60, 62. A second branch conduit 186 is connected to supply air under pressure to a conventional reversing valve 188, flow of air under pressure to valve 188 being controlled by a foot controlled valve 190. Valve 188 may be positioned selectively to connect conduit 186 to conduit 64 which connecting conduit 66 to a vent bore V or alternatively to connect conduit 186 to conduit 66 which connecting conduit 64 to vent to thus selectively reciprocate piston rod 50 relative to cylinder 48. Proximity sensors 60, 62 are respectively connected to valve 188 via conduits 60a, 62a respectively to cause an appropriate shifting of reversing valve 188 when the sensor discharge jet is interrupted by rod 58 as described above.

It is believed apparent that with on/off valve 182 opened and foot control valve 190 opened, piston rod 50 will be driven in cyclically repeated reciprocatory movement, the direction of stroke of piston rod 50 being reversed each time a proximity switch senses the proximity of interrupter rod 58. Foot control valve 190 may be of the variable opening type so that the frequency of reciprocation can be varied as desired. The amplitude of the stroke, however, is constant, being determined by the location of the proximity sensors 60, 62 and the end limits of movement of rod 50 determined by the engagement of cushions 74 with the fixed abutments defined by bushing block 72 and stud 76.

Referring now particularly to FIG. 2, reciprocation of piston rod 50 will cause a similar reciprocation of the right-hand run of endless belt 46 as viewed in FIG. 2. Because tool carrier 16 is fixedly clamped to the opposite or left-hand run of belt 46, tool carrier 16 must move in synchronism with the movement of piston rod 50, but in the opposite dirercion to the direction of movement of piston rod 50. That is, as piston rod 50 moves upwardly, the tool carrier must move downwardly and vice versa. The fact that the movement of the piston rod and tool carrier are 180 degrees out of phase with each other enables the system to substatially eliminate the shock loading generated by the sudden reversal of the direction of movement of the reciprocatory parts at stroke reversal by adjusting the weight of the moving elements—i.e., piston, piston rod, coupling member, etc., coupled to the right-hand run of belt 46 as viewed in FIG. 2 to be equal to the weight of those moving elements connected to the opposite run of the belt—i.e., tool carrier 16, saw blade B, mounting block 84 and slide 82 of the ball slide assembly 78. By having the movable elements attached to one run of the belt counterbalanced by the weight of the moving elements attached to the opposite run, and having these movable elements move in 180 degrees out of phase relationship, the shock loading encountered at stroke reversal is substantially eliminated.

This elimination of shock loading substantially eliminates vibratory movement of housing 14 and thus enables this housing to be rotatively adjustable upon a stationary mount represented by housing 12. This in turn enables the workpiece to be always mounted on a stationary, substantially vibration free horizontal work table, an advantage of particular value in connection with jewelry manufacture, particularly in the production of punch and dies employed in filigree work in jewelry manufacture according to the techniques described in British patent specification 1,594,396.

While one embodiment of the invention has been described in detail, it will be apparent to those skilled in the art the disclosed embodiment may be modified. Although described as applied to a saw blade, it is believed apparent the invention is equally adaptable to other reciprocatory tools, such as files, burnishing mandrels, etc. Therefore, the foregoing description is to be considered exemplary rather than limiting, and the true scope of the invention is that defined in the following claims.

We claim:

1. A power driven reciprocatory machine tool comprising a first frame, a pair of pulleys mounted on said first frame for free rotation about spaced parallel axes, an endless belt operatively trained about said pulleys and extending between said pulleys along opposed parallel runs lying in a first general plane normal to said axes, tool carrier means fixedly secured to said belt at a location on one of said runs, drive means including reciprocable drive member means fixedly secured to said belt at a location on the other of said runs, and cyclically reversible power driven drive means for driving said drive member means in cyclically reversed linear movement along a path parallel to said first general plane, the weight of said drive member means being substantially equal to the weight of said tool carrier means whereby inertial forces induced by the reversal of the linear movement of said drive member means and said tool carrier means are counterbalanced.

2. The invention defined in claim 1 further comprising a stationary base, a work table fixedly mounted on said base for supporting a workpiece in working relationship to said tool carrier means, and means mounting said first frame upon said base for rotative adjustment relative to said base about a horizontal axis lying in said first general plane to adjust the inclination of said table relative to said tool carrier means.

3. The invention defined in claim 2 wherein said tool carrier means comprises a rigid frame having horizontally extending upper and lower arms lying in said first general plane, respective upper and lower clamp means on each said arms for clamping a saw blade with said blade extending between said arms parallel to said runs of said belt, and means on one of said arms for applying tension to a blade clamped by said clamp means.

4. The invention defined in claim 3 wherein each of said clamp means comprises a variable radius cam mounted for movement about a first pivot axis, an abutment pin extending parallel to and located at a fixed distance from said pivot axis such that upon rotation of said cam in one direction about said pivot axis the distance between said pin and the surface of said cam progressively reduced to clamp said saw blade between said cam surface and said pin, the orientation of the clamp means on said upper arm being such that rotation of its cam in said one direction moves the curved surface of the cam toward the lower arm and the orientation of the clamp means on said lower arm being such that rotation of its cam in said one direction moves the curved surface of the cam toward the upper arm.

5. The invention defined in claim 3 wherein said means for applying tension to said blade comprises a first lever mounted at one end on said one of said arms for pivotal movement about a first axis mutually perpendicular to said arm and said blade, a second lever pivotally mounted on said first lever for pivotal movement about a second axis parallel to and displaced from said first axis, cam means movable with said second lever about said second axis frictionally engageable with said one of said arms for pivoting said first lever about said first axis upon pivotal movement of said second lever about said second axis, and means mounting one of said clamp means on the other end of said first lever.

6. The invention defined in claim 1 wherein said drive means comprises a double acting fluid motor mounted on said first frame and said drive member means comprises a reciprocatory piston rod projecting from one end of said motor, control means including stroke reversal means mounted on said first frame for actuating said motor to cyclically reciprocate said piston rod, spaced abutment means on said first frame, and cushioning means on said piston rod engageable with said abutment means as said piston rod approaches the end of a reciprocatory stroke.

* * * * *